| (12) | United States Patent<br>Smith et al. | (10) Patent No.: US 9,956,645 B2<br>(45) Date of Patent: May 1, 2018 |
|---|---|---|

(54) TUBE PROFILE MACHINING PROCESS

(71) Applicant: Dana Automotive Systems Group, LLC, Maumee, OH (US)

(72) Inventors: Johnny N. Smith, Toledo, OH (US); Thomas M. O'Neil, Holland, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days. days.

(21) Appl. No.: 15/259,463

(22) Filed: Sep. 8, 2016

(65) Prior Publication Data

US 2017/0028503 A1   Feb. 2, 2017

Related U.S. Application Data

(62) Division of application No. 14/065,511, filed on Oct. 29, 2013, now Pat. No. 9,463,527.

(Continued)

(51) Int. Cl.
*B23K 20/06* (2006.01)
*B23K 20/24* (2006.01)
(Continued)

(52) U.S. Cl.
CPC .............. *B23K 20/24* (2013.01); *B23B 41/06* (2013.01); *B23K 20/06* (2013.01); *F16C 3/023* (2013.01);
(Continued)

(58) Field of Classification Search
CPC ........ B23K 20/24; B23K 20/06; B23K 33/00; B23K 2201/06; B23K 2203/10; B23B 41/06; B23B 2222/04
(Continued)

(56) References Cited

U.S. PATENT DOCUMENTS 1,556,596 A   10/1925 Fey
1,935,063 A   11/1933 Scott
(Continued)

FOREIGN PATENT DOCUMENTS

EP   2626524 A1   8/2013
JP   S60205092 A   10/1985
(Continued)

OTHER PUBLICATIONS

International Search Report and Written Opinion for Application No. PCT/US2013/067420, dated Apr. 7, 2014, issued by the European Patent Office.

*Primary Examiner* — Brian Jennison
(74) *Attorney, Agent, or Firm* — Marshall & Melborn, LLC

(57) ABSTRACT

In a first embodiment, at a time of magnetic pulse welding, a stepped tube profile machining process axially bores a walled tube from an end inward to a transition depth to form a section with a reduced wall thickness and then axially bores the walled tube from the transition depth to a fall off depth, thereby forming a section with a maximized welding wall section. In a second embodiment, also at a time of magnetic pulse welding, a surface angle tube profile machining process axially bores at a surface angle a walled tube from an end to a bore length to form an angular welding wall thickness inward to a maximized wall section. For both embodiments, the bored surfaces are virgin with no pits, oil, residue, or oxidation thereon, thus making the machined walled tubes available for immediate magnetic pulse welding.

12 Claims, 2 Drawing Sheets

Related U.S. Application Data

(60) Provisional application No. 61/723,907, filed on Nov. 8, 2012.

(51) Int. Cl.
*F16L 9/02* (2006.01)
*F16C 3/02* (2006.01)
*B23B 41/06* (2006.01)
*F16L 13/02* (2006.01)
*B23K 33/00* (2006.01)
*B23K 101/06* (2006.01)
*B23K 103/10* (2006.01)

(52) U.S. Cl.
CPC ............. *F16L 9/02* (2013.01); *F16L 13/0209* (2013.01); *B23B 2222/04* (2013.01); *B23K 33/00* (2013.01); *B23K 2201/06* (2013.01); *B23K 2203/10* (2013.01)

(58) Field of Classification Search
USPC .......................... 219/603, 607, 617, 643, 644
See application file for complete search history.

(56) References Cited

U.S. PATENT DOCUMENTS

| | | |
|---|---|---|
| 3,535,767 A | 10/1970 | Doherty, Jr. et al. |
| 3,980,248 A | 9/1976 | Minoshima |
| 4,290,506 A | 9/1981 | Nagano et al. |
| 4,569,617 A | 2/1986 | Schmidt et al. |
| 4,610,069 A | 9/1986 | Darbois |
| 5,549,335 A | 8/1996 | Wohrstein |
| 5,752,725 A | 5/1998 | El-Sobky |
| 5,981,921 A | 11/1999 | Yablochnikov |
| 6,348,670 B2 | 2/2002 | Kistersky et al. |
| 6,400,538 B1 | 6/2002 | Kistersky et al. |
| 6,548,791 B2 | 4/2003 | Kistersky et al. |
| 6,892,929 B2 | 5/2005 | Yablochnikov |
| 7,015,435 B2 | 3/2006 | Yablochnikov |
| 7,818,881 B2 | 10/2010 | Cai et al. |
| 2006/0131300 A1* | 6/2006 | Yablochnikov ...... B23K 13/015 219/617 |
| 2008/0072584 A1 | 3/2008 | Cai et al. |

FOREIGN PATENT DOCUMENTS

| | | |
|---|---|---|
| JP | 63005887 A | 1/1988 |
| JP | H0191979 A | 4/1989 |
| JP | H08326925 A | 12/1996 |
| JP | 2000202640 A | 7/2000 |
| JP | 2001353628 A | 12/2001 |
| JP | 2011089610 A | 5/2011 |

* cited by examiner

TUBE PROFILE MACHINING PROCESS

RELATED APPLICATION

This application claims the benefit under 35 U.S.C. § 119(e) of U.S. Provisional Patent Application Ser. No. 61/723,907, filed Nov. 8, 2012, and is a divisional application of U.S. patent application Ser. No. 14/065,511, filed Oct. 29, 2013, which applications are incorporated by reference herein in their entirety.

FIELD OF THE INVENTION

The present invention relates to a machining process of an inside diameter tubular surface for attachment to an outside diameter tubular surface. More particularly, the present invention relates to a machining process of an inside diameter tubular surface for attachment to an outside diameter tubular surface, by way of magnetic pulse welding.

BACKGROUND OF THE INVENTION

Magnetic pulse welding (MPW) is a welding process that uses magnetic forces to drive two workpieces together, thereby welding the workpieces together.

Specifically, MPW involves a very high AC current that is passed through an inductive coil located near an electrically conductive material. Consequently, an intense magnetic field is locally produced that generates a secondary eddy current in the electrically conductive material. As a result, the secondary current generates a force which accelerates the electrically conductive material at a very high velocity toward a stationary material that is closely positioned in the trajectory of the electrically conductive material. In turn, the very high velocity produces an impact between the two materials, which in effect establishes a solid state weld between the electrically conductive material and the stationary material. Typically, the welds are achieved over a separation distance of only a few millimeters. For example, U.S. Pat. No. 7,015,435 to Yablochnikov, which is incorporated in its entirety herein, teaches the use of MPW.

As is the case for most welding operations, in order to produce a good weld, the attachment surfaces between the electrically conductive material and the stationary material must be clean. For example, in advance of the MPW operation, an acid is used to clean these surfaces of oil, which is followed by operations to rid the acid from the weld area and to allow time for the weld area to dry. Unfortunately, acid can leave residue, pits, and oxidation on the surfaces that can negatively affect the welding. Subsequently, these surfaces need further processing in order to remove any remaining residue that may have been left on the surfaces to be welded.

In addition, for the welding of tubular items, the wall thickness of the two materials must be appropriate to sustain a crush force that results from the acceleration of the electrically conductive material toward the stationary material. For the Yablochnikov patent, in order to assure a proper weld, the geometry is rather complex and thick (see, for example, FIGS. 19-25 of Yablochnikov), which in turn requires added power to produce an effective magnetic pulse weld.

Consequently, it would be beneficial to provide better conditions that would not require acid, abrasion, added processing time, complex geometry, more wall thickness, and higher power to produce. In turn, this should result in a faster production cycle time, lower material and labor costs, and a better quality part.

SUMMARY OF THE INVENTION

In a first embodiment, just prior to or at a time of magnetic pulse welding, a stepped tube profile machining process comprises axially boring a walled tube from an end thereof inward to a transition depth, thereby forming a first section with a reduced welding wall thickness. Further, the tube profile machining process comprises axially boring the walled tube from the transition depth to a fall off depth, thereby forming a second maximized welding wall section that is thinner than the original walled tube thickness but has greater thickness than the reduced wall thickness. Wherein, the bored surfaces, between the end of the walled tube to the fall off region, are virgin with or having no pits, oil, debris, or oxidation thereon, by removing these items. Thus, the machined walled tube is made available for immediate magnetic pulse welding. This process lends itself to thicker walled tubes.

In a second embodiment, just prior to or at a time of magnetic pulse welding, a tapered tube profile machining process comprises axially boring, at a surface angle, a walled tube from an end thereof to a bore length, thereby forming an angular welding wall thickness, to a maximized welding wall section. Wherein, the bored surface, between the end of the walled tube to the bore length, is virgin with or having no pits, oil, debris, or oxidation thereon, by removing these items. Thus, the machined walled tube is made available for immediate magnetic pulse welding. This process lends itself to thinner walled tubes.

Further objects and advantages of the present invention will be apparent from the following description, reference being made to the accompanying drawings forming a part of a specification, wherein like reference characters designate corresponding parts of several views.

DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
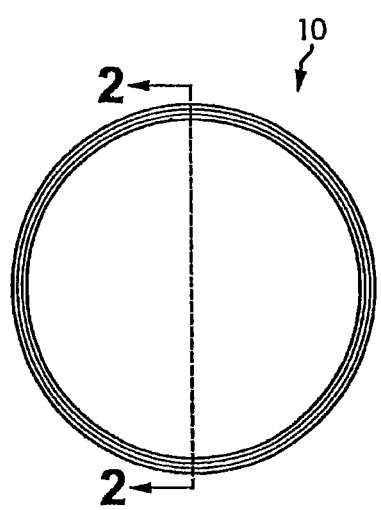
FIG. 1 is an axial view of an embodiment at an end of a tube in accordance with the present invention.
Figure 2:
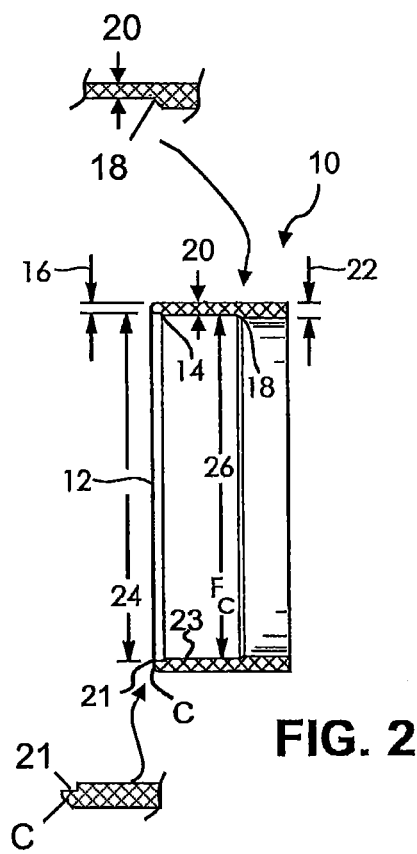
FIG. 2 is a cross sectional side view, with two insets, of the tube along the lines 2-2 of FIG. 1.

FIGS. 1 and 2 illustrate a first embodiment of the present invention where a stepped tube profile machining process has been applied to a walled tube 10 comprising, for example, a high strength aluminum alloy. Although a circular cross section tubes are illustrated herein, other cross sections, like square, rectangular, triangular, do apply.

Just prior to or at a time of magnetic pulse welding, the walled tube 10 is axially bored in from an end 12 thereof (for example, having an overall diameter of approximately 178.4 mm) with a chamfer C (for example, 45°, as shown in a lower inset of FIG. 2) on the outside edge, to a transition depth 14 (for example, inset approximately 5.6 mm), thereby forming a section with a reduced welding wall thickness 16 (for example, inset approximately 4.4 mm).

Next, in the stepped tube profile machining process, the walled tube 10 is axially bored from the transition depth 14 to a fall off depth 18, as also shown in the upper inset of FIG. 2 (for example, approximately 36.8 mm therebetween the depths 14 and 18), thereby forming a maximized welding wall section 20 thickness (for example, of approximately 5.9 mm) that is thinner than the original walled tube thickness 22 (for example, of approximately 6.7 mm) but is thicker than the reduced wall thickness 16. Wherein, the inside bored surfaces 21, 23 between the end 12 of the walled tube 10 to the fall off region 18 are virgin or having no pits, oil, residue, or oxidation thereon, thus making the machined walled tube 10 available for immediate magnetic pulse welding. In general, see Yablochnikov and others regarding the specifics of MPW.

This process of removing pits, oil, residue, or oxidation also applies to an inside tapered bored surface 40 of a second embodied tube 30 that is discussed below in much detail. The above-stated process for the first embodied tube 10, however, lends itself to thicker walled tubes.

The reduced welding wall thickness 16 is made by increasing the bore diameter 24 along the inside of the walled tube 10 which serves to reduce crush force $F_c$ requirements needed to achieve welding. The transition depth 14 is where the profile moves from the bore diameter 24 into the fit diameter 26, which is also a control region because both its shape and thickness can also strongly influence the crush force $F_c$. In general, a reduced wall thickness, that can sustain the crush force $F_c$ needed, requires less energy that in turn results in a better magnetic pulse weld.

The fall off region 18 is where the machined surfaces 21, 23 transition into an un-machined surface. The fall off region 18 is important because the stress concentration levels are the highest here so care is needed to minimize any sharp transitions (e.g., the angled area shown in the upper inset of FIG. 2 where the reference line for the reference item 18 is pointing is slanted) in diameter or surface textures, for example, free of pits, oil, debris, and oxidation. This applies to both embodiments 10, 30, where process specifications that limit the amount and types of pits, oil, debris, and oxidation are maintained.

Figure 5:
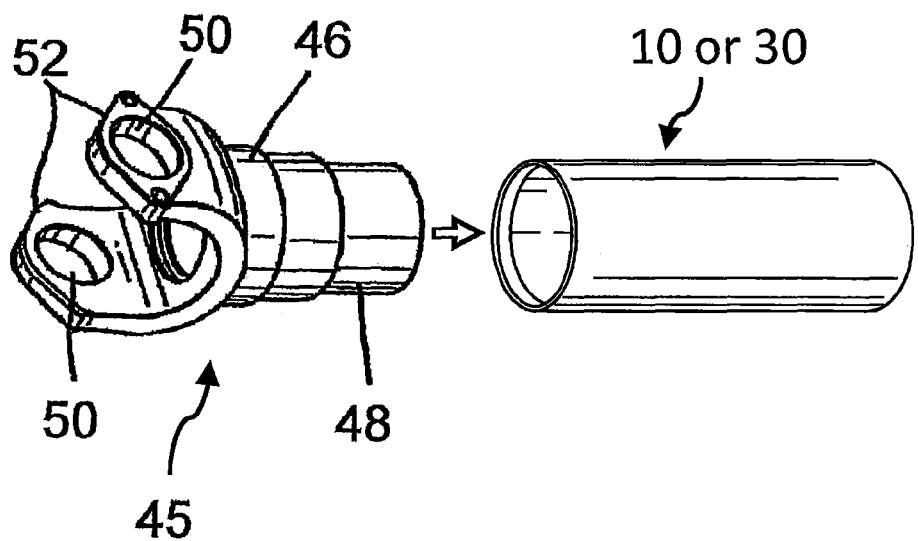
FIG. 5 is a perspective side view of an end fitting and the tube of FIG. 1 or FIG. 3.

In other words, the above-described process can result in an end fitting 45 being magnetic pulse welded (see arrow in FIG. 5 indicating that the end fitting 45 is to be moved within the walled tube 10 for applying MPW) to the walled tube 10 that has the axial bore 24 from the end 12 inward to the transition depth 14, with the first bored surface 21 within, and the first reduced end fitting wall thickness 16. The stepped tube further has the axial bore 26 from the transition depth 14 inward to the fall off depth 18 with the second bored surface 23 within and the second reduced end fitting wall thickness 20 that is thicker than the first reduced wall thickness 16. Consequently, the axial boring of both surfaces 21, 23, removes pits, oil, debris, and oxidation from the end 12 of the walled tube to the fall off depth 18 for immediate magnetic pulse welding of the walled tube 10 to the end fitting 45. In other words, the surfaces 21, 23 are free of pits, oil, debris, and oxidation and are magnetic pulse welding ready.

Figure 3:
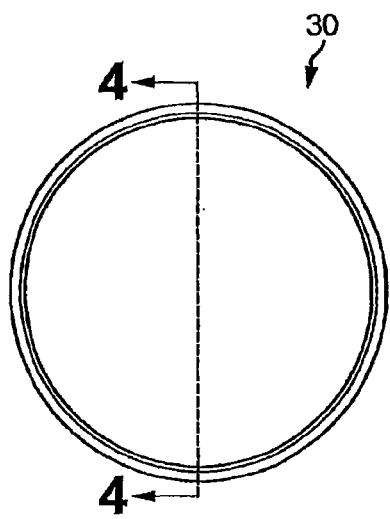
FIG. 3 is an axial view of another embodiment at an end of another tube in accordance with the present invention.
Figure 4:
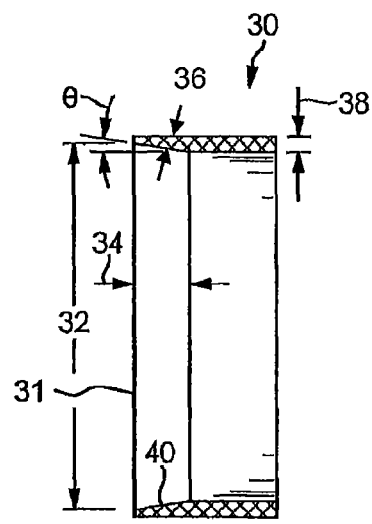
FIG. 4 is a cross sectional side view of the other tube along the lines 4-4 of FIG. 3.

FIGS. 3 and 4 illustrate a second embodiment of the present invention where a tapered tube profile machining process has been applied to a walled tube 30. Just prior to or at a time of magnetic pulse welding, the walled tube 30 is axially bored on a taper at a surface angle θ (for example, 60°), from an end 31 thereof into the walled tube 30 to a bore length 34, thereby forming a tapered angular welding wall thickness 36 into a maximized welding wall section 38. Wherein, the angular tapered boring forms an inside tapered bored surface 40, between the end 31 of the walled tube 30, to the bore length 34 at a maximized section. As such, the boring removes pits, oil, debris, and oxidation from the end 32 of the walled tube to the bore length 34 for immediate magnetic pulse welding of the walled tube 30. In other words, the surface 40 is free of pits, oil, debris, and oxidation and is magnetic pulse welding ready. This process lends itself to thinner walled tubes.

The open end 31 of bore 32 is the starting theoretical diameter where a bore cut begins. The surface angle θ is the angle of the machined surface 40, therefore, this surface 40 is controlled by process specification for texture. The bore length 34 is that length to which the bored surface 40 must be properly textured and transitioned. This tapered profile embodiment provides less complicated boring for simpler MPW applications.

In other words, the above-described second embodied process can result in magnetic pulse welding an end fitting to a walled tube 30 (see arrow in FIG. 5 indicating that the end fitting 45 is to be moved within the walled tube 30 for applying MPW) that has the axial bore 32 at a surface angle θ from an end 31 thereof inward to bore length 34, with an angular weld wall thickness 36 inward to the maximized welding section 38. Consequently, axial boring of the surface 40 removes pits, oil, debris, and oxidation from the end of the walled tube to the maximized welding wall section 38 for immediate magnetic pulse welding of the walled tube 30. In general, see Yablochnikov and others regarding the specifics of MPW.

Advantages achieved while preparing the surfaces of the bores, just prior to or at the time of initiating the MPW process, saves material and labor costs. With all things considered, these instant MPW processes are advantageous over MPW processes that require acid and/or abrasive surface preparation, thicker walled tubing that consume more energy to produce the pulse welds, and which are not accomplished just before or at the time of attachment of the tubular parts. Thereby, the present invention lowers processing time, while producing better quality parts.

In addition, the two embodiments of the present invention present better tubular geometries that allow for reduced energy requirements for utilizing MPW for the attachment of items, like attaching a vehicular driveshaft tube to a driveshaft yoke. Hence, the subject invention could be used to magnetic pulse weld the walled tubes 10 or 30, shown in FIG. 5 as vehicular driveshafts like in the Yablochnikov patent, to a driveshaft yoke 45.

The subject instant embodiments, however, are not limited to those shown in FIGS. 1-5. Instead, attachment by way of MPW of any two complementary parts can be accomplished in the above-described manners by reducing the cross sections of such parts, which in turn lowers the energy required for less material, while still maintaining wall strength (i.e., providing sufficient material that is available to absorb the resulting crush forces $F_c$) associated with the welding of tubes and the strength of the resultant welds.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A tapered tube profile machining process, comprising:
providing a drive shaft tube having an open end;
providing an end fitting;
forming a bored surface within the drive shaft tube, wherein said bored surface of said drive shaft tube has a surface angle $\theta$;
axially boring the drive shaft tube inward at a surface angle $\theta$ from the open end of the drive shaft tube a bore length, wherein the axially boring removes pits, oil, debris, and oxidation from the open end of the drive shaft tube across the bore length of the axle boring, so as to form the bored surface within the drive shaft tube having an angular welding wall thickness extending inward toward a maximized welding wall section of the drive shaft tube;
attaching the end fitting to the drive shaft tube; and
wherein the axially boring step does not require any additional processing before the attachment of the drive shaft tube to the end fitting.

2. The tapered tube profile machining process of claim 1, further comprising inserting an end of the end fitting into the axially bored end of the drive shaft tube until the end of the end fitting is in contact with the maximized welding wall section of the drive shaft tube.

3. The tapered tube profile machining process of claim 1, wherein the end fitting comprises a tube yoke.

4. The tapered tube profile machining process of claim 1, wherein the end fitting and drive shaft tube comprise a high strength aluminum alloy.

5. The tapered tube profile machining process of claim 1, wherein the surface angle $\theta$ is 60°.

6. The tapered tube profile machining process of claim 1, further comprising selecting tubular geometries, so as to reduce an amount of crush force needed to achieve the attachment of the drive shaft tube to the end fitting.

7. The tapered tube profile machining process of claim 1, further comprising varying the cross sections of the drive shaft tube and end fittings, thereby maintaining wall strength and reducing crush forces.

8. A tapered tube and end fitting, comprising:
an end fitting;
a drive shaft tube comprising an open end;
wherein the open end of the drive shaft tube has an axial bore at a surface angle $\theta$;
wherein the axial bore of the driveshaft tube extends a bore length from the open end of the drive shaft tube inward toward a maximized welding wall section of the drive shaft tube;
wherein the maximized welding wall section of the drive shaft tube has an angular weld wall thickness;
wherein the axially bored surface of the drive shaft tube does not have pits, oil, debris, and oxidation along the bore length of the axially bored surface of the drive shaft tube; and
wherein an end of the end fitting is inserted within the axially bored open end of the drive shaft tube and attached to the drive shaft tube.

9. The tapered tube and end fitting of claim 8, wherein the end fitting is a tube yoke.

10. The tapered tube and end fitting of claim 8, wherein the end fitting is attached to the drive shaft tube by using magnetic pulse welding.

11. The tapered tube and end fitting of claim 8, wherein the surface angle $\theta$ is 60°.

12. The tapered tube profile machining process of claim 1, wherein the end fitting is attached to the drive shaft tube by magnetic pulse welding.

* * * * *